INVENTOR.
Earl E. Treanor
BY
ATTORNEY.

United States Patent Office 3,094,133
Patented June 18, 1963

3,094,133
CHEMICAL FEED AND BLOWDOWN SYSTEM
Earl E. Treanor, Leawood, Kans.
(% Treanor Corp., 4012 Truman Road, Kansas City, Mo.)
Filed July 22, 1959, Ser. No. 828,841
3 Claims. (Cl. 137—101.11)

This invention relates to apparatus for water treatment and refers more particularly to apparatus for adding to water chemicals soluble therein. A particular application resides in controlling the pH and quantity of dissolved solids in cooling tower water.

The use of tower heat exchangers to control the temperature of water employed in the cooling of diesel engines, compressors, air conditioners, air conditioning systems, etc. is well known. It is also well known that untreated water, even if reasonably low in hardness, is usually not adapted without treatment as feed for tower heat exchangers. Among the damages that untreated feed water may cause are rapid corrosion of work surfaces, lines and fittings, development of leaks caused by unequal expansion and contraction arising from overheating due to deposition of heat insulating scale, bulging of lines, loss of temperature exchanging ability, and complete clogging of lines and tubes due to scale deposit.

Two specific problems are almost universally encountered in untreated feed water. In the first place, water supplied as untreated feed generally contains an excess of calcium bicarbonate. Acid treatment conventionally is required to transform the bicarbonate to sulfate which will remain in solution. The second problem of tower heat exchangers is the fact that evaporation therefrom results in concentration of minerals in the water remaining in the cooling tower and, as the evaporation rate is uncertain, the rate of concentration of minerals is also uncertain or unknown.

Therefore, one object of the instant invention is to provide an apparatus for supplying pH-controlling chemicals to the feed water to a cooling tower at a rate proportional to the flow of water to the tower, independent of the line pressure.

Another object of the invention is to provide apparatus for accurately regulating the concentration of minerals in cooling tower water, independent of the rate of evaporation from the tower or variation in quantity of flow of water to the tower.

Another object of the invention is to provide apparatus for accurately controlling the pH of the flow of water into a cooling tower and the concentration of minerals in the tower water both within a very closely limited range.

Yet another object of the invention is to provide a substantially automatic control of both pH of the feed water to the tower and concentration of the minerals in the tower water which substantially avoids manual operation, minimizes the space required, makes repair and replacement of any or all parts in the system easy and requires a minimum of supervision.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

Figure 1:
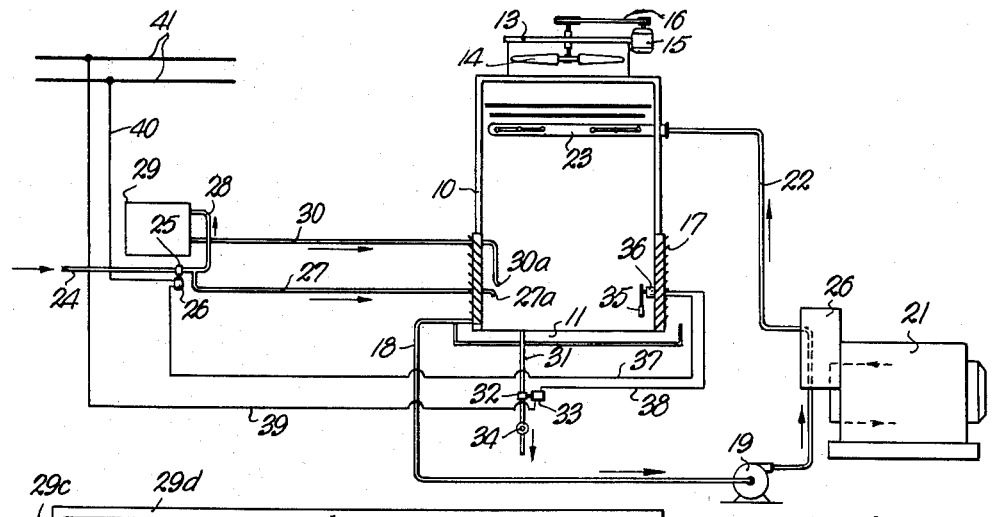
FIG. 1 is a schematic flow diagram of a typical conventional cooling tower with the inventive means of controlling the pH of the feed water to the tower and the concentration of minerals in the water illustrated schematically therein.

Referring to the drawings, and more particularly to FIG. 1, at 10 is shown the housing of a conventional heat exchanging cooling tower having a sump, the floor of which is indicated at 11. Positioned atop the tower 10 is housing 13 which mounts circulating fan 14 operated by electric motor or other conventional power source 15 through belt 16. Latticed walls 17 permit circulation of air through the body of the tower. Cooled water from the sump 11 is withdrawn through line 18 and passed by pump 19 to heat exchange 20 on work 21 and then returned by line 22 to spray head 23 in the tower. Work 21 may be any conventional piece of equipment such as a diesel engine, compressor, air conditioning unit, etc.

Turning to the left-hand side of FIG. 1, input flowline 24 is controlled at 25 by a valve operated by solenoid 26. After valve 25, line 24 is split into main tower supply line 27 and by-pass flowline 28. Main tower flowline 27 discharges into the tower at 27a. By-pass flowline 28 passes to the housing of chemical feeder 29, to be described, from which by-pass recycle line 30 passes chemically treated water to the tower to be discharged at 30a, preferably close enough to 27a for simultaneous sampling to be made at both lines.

Typical chemical treating reactions in the tower include:

(1) 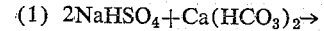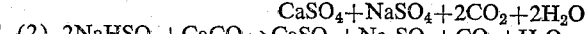
$2NaHSO_4 + Ca(HCO_3)_2 \rightarrow CaSO_4 + NaSO_4 + 2CO_2 + 2H_2O$ (2) $2NaHSO_4 + CaCO_3 \rightarrow CaSO_4 + Na_2SO_4 + CO_2 + H_2O$ Thus calcium carbonate is changed to calcium sulfate which will remain in solution in the water and not plate out as scale in the tower, work or lines. Reaction in the tower takes place at the confluent of lines 30 and 27. Sulfonic acid ($NH_2SO_4$) is also contemplated as additives as are sodium bichromate and hexametaphosphate.

A blowdown line 31 is taken off the sump 11 of tower 10, the flow therefrom controlled by valve 32 operated by solenoid 33. Meter valve 34 controls adjustably the permissible discharge flow through line 31.

Level indicator 35 of the float type is connected to electrical sensing means 36 or switching apparatus of conventional type which will, by suitable electrical connections, as shown by lines 37–40, inclusive, to solenoids 26 and 33, simultaneously open the valves 25 and 32 when the water level in the sump 11 falls to a predetermined level and simultaneously close the same valves when the water level in the sump rises to a second, different higher level. The lines 37–40 connecting solenoids 26 and 33 with the switching means or sensing device 36 are connected to any conventional source of electrical power indicated at 41.

Figure 2:
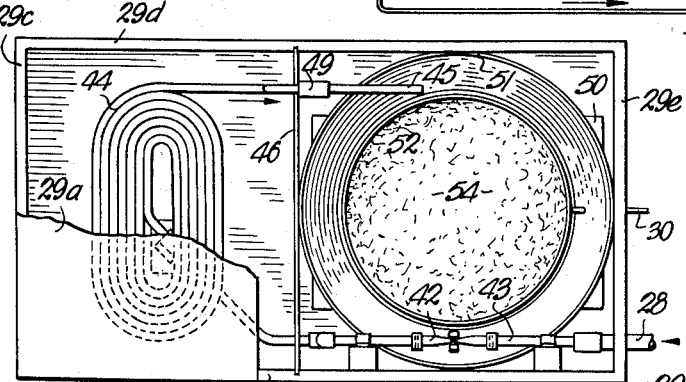
FIG. 2 is a plan view of chemical feeding apparatus embodying the invention adapted to aid in controlling the pH of the feed water to the tower.
Figure 3:
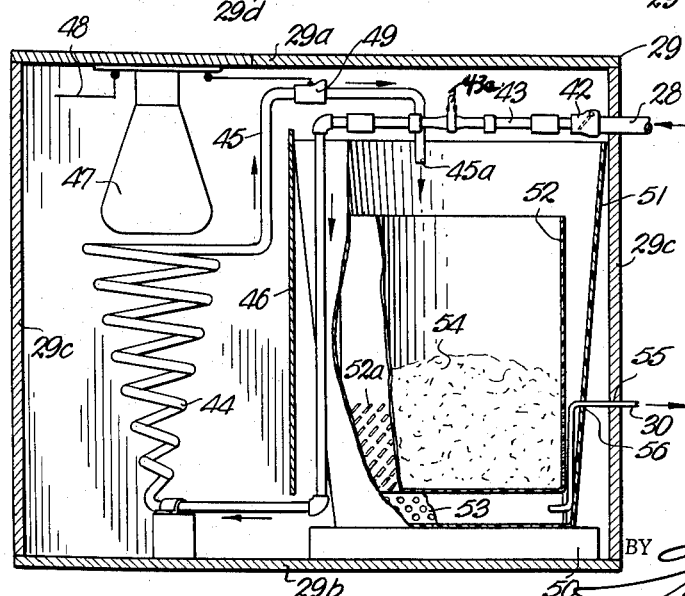
FIG. 3 is a side partly sectional and partly cutaway view of the apparatus of FIG. 2.

Referring to FIGS. 2 and 3, therein is detailed the chemical feeding apparatus comprising a portion of the invention generally designated at 29 in FIG. 1. Rectangular housing 29 has top wall 29a, bottom wall 29b, end walls 29c and side walls 29d.

Input flow by-pass line 28 has check valve 42 thereon to permit only one way flow of liquid. From valve 42, line 43 passes inwardly of housing 29 and down adjacent floor 29b thereof. Quantity of flow is controlled by pinch clamp 43a or other valve regulator means. Coil 44 is formed in line 43 and from coil 44, line 45 passes up over partition 46 which divides housing 29 and has free discharge end 45a pointing downwardly past partition 46. Means for applying heat to the coil 44, such as an infrared bulb 47 is provided, powered by conventional electricity input 48. The action of heating means 47 is controlled by temperature sensing switch or thermostat 49 which, when the temperature of the liquid in line 45 is too low, actuates heating means 47 to apply heat to the coil 44. Partition 46 operates to restrict the heating effect to the coil in the one side of housing 29.

Positioned on pedestal or support 50 is first large container 51 which is of suitable nonreactive material such as polyethylene. A second smaller container 52 of the same type of material is positioned concentrically and centrally of container 51 and is supported, optionally, on a spacing means, such as a perforated inverted vessel 53 of the same material which provides a fluid reservoir therebelow. Container 52 is perforated or slotted as at 52a to a regulated height circumferentially thereof. Water treating chemical substance 54, such as sodium bisulfate ($NaHSO_4$) is positioned within second container 52. Treated water recycle line 30 penetrates housing 29 through opening 55 and outer container 51 through opening 56 with its lower pickup end in reservoir 53. The position of recycle line 30 is preferably at or slightly above the top level of perforation 52a on inner container 52. An air bleed line (not shown) may be attached by T union at the upper turn of line 30 extending to the top level of 52 or therebelow to permit and facilitate continuous flow.

In the operation of the system illustrated in the figures, the circulation of water to and from the work relative to the cooling tower in conventional fashion has already been described.

Feed water is input through line 24 controlled by valve 25. The water is then split into two streams, the stream in line 27 going directly to the sump of the cooling tower and the by-pass stream going to housing 29. Water input through line 28 to housing 29 passes check valve 42 and flows to coil 44 controlled in quantity relative to line 27 by adjustable pinch clamp 43a. On reaching thermostat 49, the temperature of the liquid determines whether or not the heating means 47 is actuated to raise the temperature of the liquid in the line. Suitable chemical for controlling pH, such as sodium bisulfate is in position in inner container 52. The water to be treated, in metered flow, passes into outer container 51 from where, by absorption, it picks up chemical through slots 52a.

The liquid then passes out through slots or perforations 52a into outer container 51 or into the fluid reservoir defined by support means 53. The denser chemically saturated liquid or water by specific gravity migrates downwardly into reservoir 53. This liquid resides in solubility equilibrium with chemical 54. It should be emphasized that other water treatment chemicals may be employed in the place of sodium bisulfate such as alum. The chemically treated water is drawn off from reservoir 53 through line 30 only as the level of liquid in the outer container 51 reaches the opening 56 which holds line 30. So long as the liquid level in container 51 is above the line 30, the chemically treated liquid will flow through line 30 into the cooling tower. In this manner only saturated liquid is taken through line 30. If desired, an agitation may be employed in 51 or 53 to increase concentration. The liquid passing through the chemical feeder is itself treated by the chemical, but its main function is to carry in solution, a maximum quantity of chemical (as $NaHSO_4$) to the tower mix point. Maximum solubility at a given controlled temperature is desired and achieved.

The water in line 24 is gravity fed or driven by a pump (not shown) controlled by valve 25. The metering of the water between lines 27 and 28 is controlled by pinch clamp 43a and the relative line sizes. If there is low pressure in line 24, restriction may be placed on line 27 by suitable valve means to retain proportional flow always into line 28. Feed through lines 30 and 27 to the cooling tower may be by gravity or under the impetus of the said pump. The outputs of lines 30 and 27 at 30a and 27a are preferably close enough together that simultaneous flow from both can be received in a container for suitable pH testing in equivalent quantities. It is generally desired (in the system being specifically described here) to hold the pH at 7.2 to 7.3, that is, very slightly alkaline. By arranging the chemical feed system in parallel with the main input water line, it is possible to pass a proportional amount of water through the chemical feed housing 29 which, as it is in solubility equilibrium with the chemical 54 therein, and as the water temperature and solubility thereof is controlled, thus feeds a proportionate amount of chemical into the water which goes into the tower, independent of line pressure. Thus, once the general character of the feed water in line 24 is identified for a given area, a range of chemical usage per unit time for a given average water consumption by the tower can be calculated and the housing 29 need be opened only for repair and replenishing the chemical supply at regular intervals. Testing the pH in the tower twice a day usually will maintain adequate control over this factor and permit very close control over the pH of the water in the tower.

In the use of the tower, evaporation of water constantly takes place as heat exchanging takes place at the work load. Thus there is a constant tendency to concentrate minerals which do not pass off with evaporation in the water in the tower. This factor must be compensated for at regular intervals. Means have been provided for this purpose as follows:

When valve 25 is actuated by the float and sensing mechanism 36 as the water level drops to the predetermined level, valve 32 is also opened on blowdown line 31. The discharge capacity of line 31 is metered by valve 34 to discharge a precise proportionate amount of water relative the quantity of water being input to the tower whereby the concentration of minerals in the water remaining in the tower will be lessened by a proportionate amount to the fresh water being input to the sump. Thus the total solids removed will be directly proportional to the quantity of raw water input to the sump. Periodic purging, required in conventional units, is thus avoided with all input and output flow of water to the tower being controlled at the same time. Thus, also, the percentage concentration of solids and minerals in the water is strictly controlled within certain limited ranges, which is also desirable.

From the foregoing it will be seen that this invention is one well adapted to attain all of the ends and objects of the invention hereinbefore set forth, together with other advantages which are obvious and which are inherent to the construction and process.

Inasmuch as many possible embodiments of the invention may be made without departing from the scope thereof, it is to be understood that all matter hereinabove set forth or shown in the accompanying drawings is to be interpreted as illustrative and not in a limiting sense.

It also will be understood that certain features and subcombinations are of utility and may be employed without reference to other features and subcombinations. This is contemplated by and is within the scope of the appended claims.

Having thus described my invention, I claim:

1. In a cooling water apparatus, a cooling tower having a sump from which water is passed to the work to be cooled, a source of water, a first input flowline from said source of water to said sump, a first valve in said first flowline, a by-pass line from said flowline after said valve and before said sump, a throttling valve in said by-pass line to control the relative flow rate therethrough relative to the flow through said first input flowline past the first valve, means for treating the water in said by-pass line to control its pH, and second input line means for passing said pH controlled water from said treating means to said sump.

2. Apparatus as in claim 1 wherein the inputs from the first input flowline and second input flowline enter the sump at positions sufficiently close together to permit simultaneously sampling therefrom.

3. In a cooling water apparatus, a cooling tower having a sump from which water is passed to the work to be cooled, a source of water, a first input flowline from said source of water to said sump, a first valve on said first input flowline, a by-pass line from said first flowline after said first valve and before said sump, a throttling valve in said by-pass line operative to control the flow therethrough relative to the flow through said first input flowline past the said first valve, means for regulating the pH of the water in said by-pass flowline, second input line means for passing said pH controlled water to said sump, an output flowline from said sump, a second valve and a second throttling valve on said output flowline, means connected to said first and second valves for opening and closing them as the water level in said sump varies whereby to replenish said sump with raw water and simultaneously withdraw mineral concentrated water therefrom, the flow capacity of the output line proportioned by means of the throttling valve thereon relative to the flow capacity of the first and second input lines so as to withdraw such regulated quantities of water therefrom as to tend to control within limited ranges the insoluble constituents in the water and the sump.

References Cited in the file of this patent

UNITED STATES PATENTS

| | | |
|---|---|---|
| 846,100 | Estep | Mar. 5, 1907 |
| 2,562,827 | Simpson | July 31, 1951 |
| 2,704,241 | Gannon | Mar. 15, 1955 |
| 2,766,767 | Hodgens | Oct. 16, 1956 |
| 2,809,818 | Munters | Oct. 15, 1957 |
| 2,859,766 | Shuldener | Nov. 11, 1958 |
| 3,028,875 | Alguire | Apr. 10, 1962 |